(12) United States Patent
Madineni

(10) Patent No.: US 11,897,340 B2
(45) Date of Patent: Feb. 13, 2024

(54) SYSTEMS AND METHODS FOR FREE WHEEL TOWING

(71) Applicant: Rivian IP Holdings, LLC, Plymouth, MI (US)

(72) Inventor: Rahul Madineni, Farmington Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 302 days.

(21) Appl. No.: 17/318,683

(22) Filed: May 12, 2021

(65) Prior Publication Data

US 2022/0363139 A1 Nov. 17, 2022

(51) Int. Cl.
*B60L 15/20* (2006.01)
*B60W 10/08* (2006.01)
(Continued)

(52) U.S. Cl.
CPC ......... *B60L 15/2018* (2013.01); *B60W 10/08* (2013.01); *B60W 10/18* (2013.01);
(Continued)

(58) Field of Classification Search
CPC ............. B60L 15/2018; B60L 15/2027; B60L 2240/642; B60T 2201/04; B60T 2201/06; B60W 2552/15; B60W 30/18054; B60W 30/18118; B60W 40/076; B60W 10/18; B60W 10/182; B60W 10/184; B60W 10/188; B60W 10/192; B60W 10/196; B60W 10/198; B60W 2710/18; B60W 2710/182; B60W 2710/184; B60W 2710/186; B60W 2710/188; B60W 2030/041; B60W 2030/043; B60W 30/02; B60W 30/025; B60W 30/04; B60W 30/045; B60W 2300/14; B60W 2300/145;
(Continued)

(56) References Cited

U.S. PATENT DOCUMENTS 10,821,977 B1 * 11/2020 Stein ..................... B60W 10/08
2013/0238205 A1 * 9/2013 Edwards ................. B60T 17/02
74/108

(Continued)

FOREIGN PATENT DOCUMENTS

DE 102018122953 A1 * 3/2020 ............. B60T 13/04
JP 6463683 B2 * 2/2019 ............ B60T 13/686

OTHER PUBLICATIONS

Machine translation of DE-102018122953-A1 (Year: 2020).*

*Primary Examiner* — Christian Chace
*Assistant Examiner* — Scott R Jagolinzer
(74) *Attorney, Agent, or Firm* — Foley & Lardner LLP

(57) ABSTRACT

Various disclosed embodiments include illustrative drive unit controllers, drive units, and vehicles. In an illustrative embodiment, a drive unit controller includes a processor having computer-readable media configured to store computer-executable instructions configured to cause the processor to receive free-wheel tow mode activation information, activate a hold mode based on the received free-wheel tow mode activation information, generate a zero-speed command in response to the hold mode being activated, and send the generated zero-speed command to a stabilizing system of the associated vehicle.

20 Claims, 3 Drawing Sheets

(51) Int. Cl.
B60W 10/18 (2012.01)
B60W 30/02 (2012.01)
H02P 27/06 (2006.01)

(52) U.S. Cl.
CPC ............ B60W 30/02 (2013.01); H02P 27/06 (2013.01); B60L 2240/642 (2013.01); B60W 2530/203 (2020.02); B60W 2552/15 (2020.02); B60W 2710/081 (2013.01); B60W 2710/083 (2013.01); B60W 2710/18 (2013.01)

(58) Field of Classification Search
CPC ..... B60W 2530/203; B60W 2530/205; B60W 2530/207; B60Y 2300/181; B60Y 2300/18116; B60Y 2300/28; F16D 2500/50825; F16D 2500/50841; F16D 2500/50891; F16H 2061/0227; F16H 2061/205; F16H 61/20; F16H 2061/226; Y10S 188/02; Y10T 137/87257; B60G 2400/97; B60G 2400/98; G05D 1/0061; G05D 1/0088; G05D 1/0214; G05D 1/0221; G05D 1/0223; G05D 1/021
See application file for complete search history.

(56) References Cited

U.S. PATENT DOCUMENTS

| | | | |
|---|---|---|---|
| 2018/0134300 A1* | 5/2018 | Anschuber | B60W 30/18136 |
| 2018/0186377 A1* | 7/2018 | Bramson | B60L 50/61 |
| 2020/0136534 A1* | 4/2020 | Wu | B60L 7/006 |
| 2020/0262468 A1* | 8/2020 | George | B60W 50/16 |
| 2020/0324745 A1* | 10/2020 | Falcon | B60T 8/171 |
| 2021/0347216 A1* | 11/2021 | Robertson | G05D 1/0027 |
| 2022/0105813 A1* | 4/2022 | He | B60W 10/08 |
| 2022/0289039 A1* | 9/2022 | Boaretto | B60L 50/16 |
| 2022/0324433 A1* | 10/2022 | Salter | B60L 3/106 |
| 2023/0157913 A1* | 5/2023 | Derenne | A61G 7/0528 5/600 |
| 2023/0174043 A1* | 6/2023 | Goossens | B60W 20/15 701/50 |
| 2023/0271508 A1* | 8/2023 | Healy | B60K 7/0007 180/2.2 |

* cited by examiner

SYSTEMS AND METHODS FOR FREE WHEEL TOWING

The present disclosure relates to electric vehicle towing. The statements in this section merely provide background information related to the present disclosure and may not constitute prior art.

As shown in FIG. 1, when an electric vehicle is to be towed by another vehicle (such as a recreational vehicle (RV)), the electric vehicle being towed is placed into neutral. After the vehicle is placed in neutral, the vehicle is chocked to ensure that the vehicle does not roll away while the user is attaching the towing vehicle.

BRIEF SUMMARY

Various disclosed embodiments include illustrative drive unit controllers, drive units, and vehicles.

In an illustrative embodiment, a drive unit controller includes a processor having computer-readable media configured to store computer-executable instructions configured to cause the processor to receive free-wheel tow mode activation information, activate a hold mode based on the received free-wheel tow mode activation information, generate a zero-speed command in response to the hold mode being activated, and send the generated zero-speed command to a stabilizing system of the associated vehicle.

In another illustrative embodiment, a drive unit includes an electric motor, an encoder configured to generate motor speed information of the electric motor, an inverter configured to control operation of the electric motor, and a drive unit controller. The drive unit controller includes a processor having computer-readable media configured to store computer-executable instructions configured to cause the processor to receive free-wheel tow mode activation information, activate a hold mode based on the received free-wheel tow mode activation information, generate a zero-speed command in response to the hold mode being activated, and send the generated zero-speed command to a stabilizing system of the associated vehicle.

In another illustrative embodiment, a vehicle includes a human-machine interface unit configured to generate a tow mode activation signal, a vehicle status unit configured to generate slope grade information, and a drive unit. The drive unit includes an electric motor, an encoder configured to generate motor speed information of the electric motor, an inverter configured to control operation of the electric motor, and a drive unit controller. The drive unit controller includes a processor having computer-readable media configured to store computer-executable instructions configured to cause the processor to receive free-wheel tow mode activation information, activate a hold mode based on the received free-wheel tow mode activation information, generate a zero-speed command in response to the hold mode being activated, and send the generated zero-speed command to a stabilizing system of the associated vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
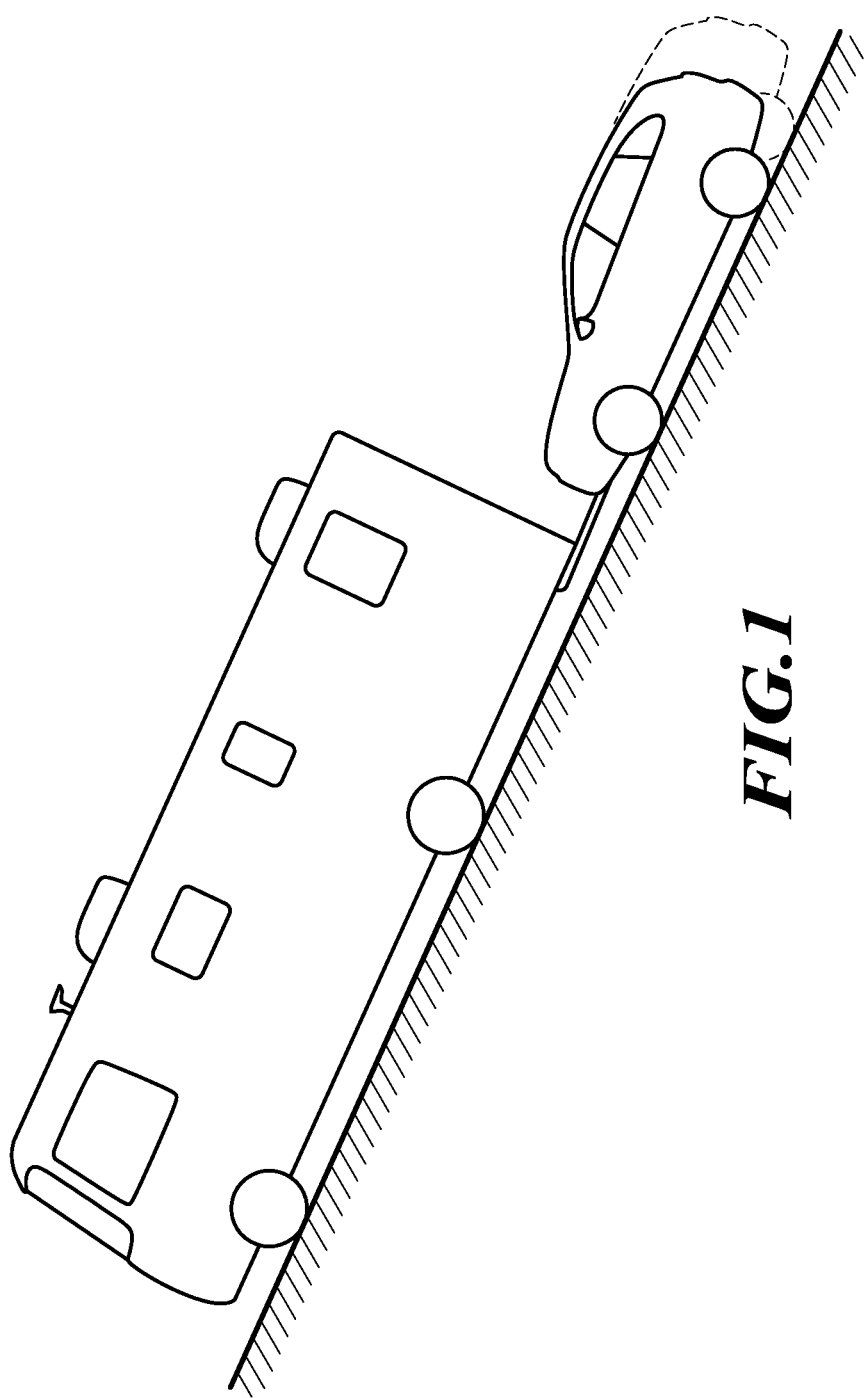
FIG. 1 is an illustration of a vehicle in a towing operation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative drive unit controllers, drive units, and vehicle. In such embodiments, illustrative systems and methods may control vehicle tow operations on a hill.

Figure 2:
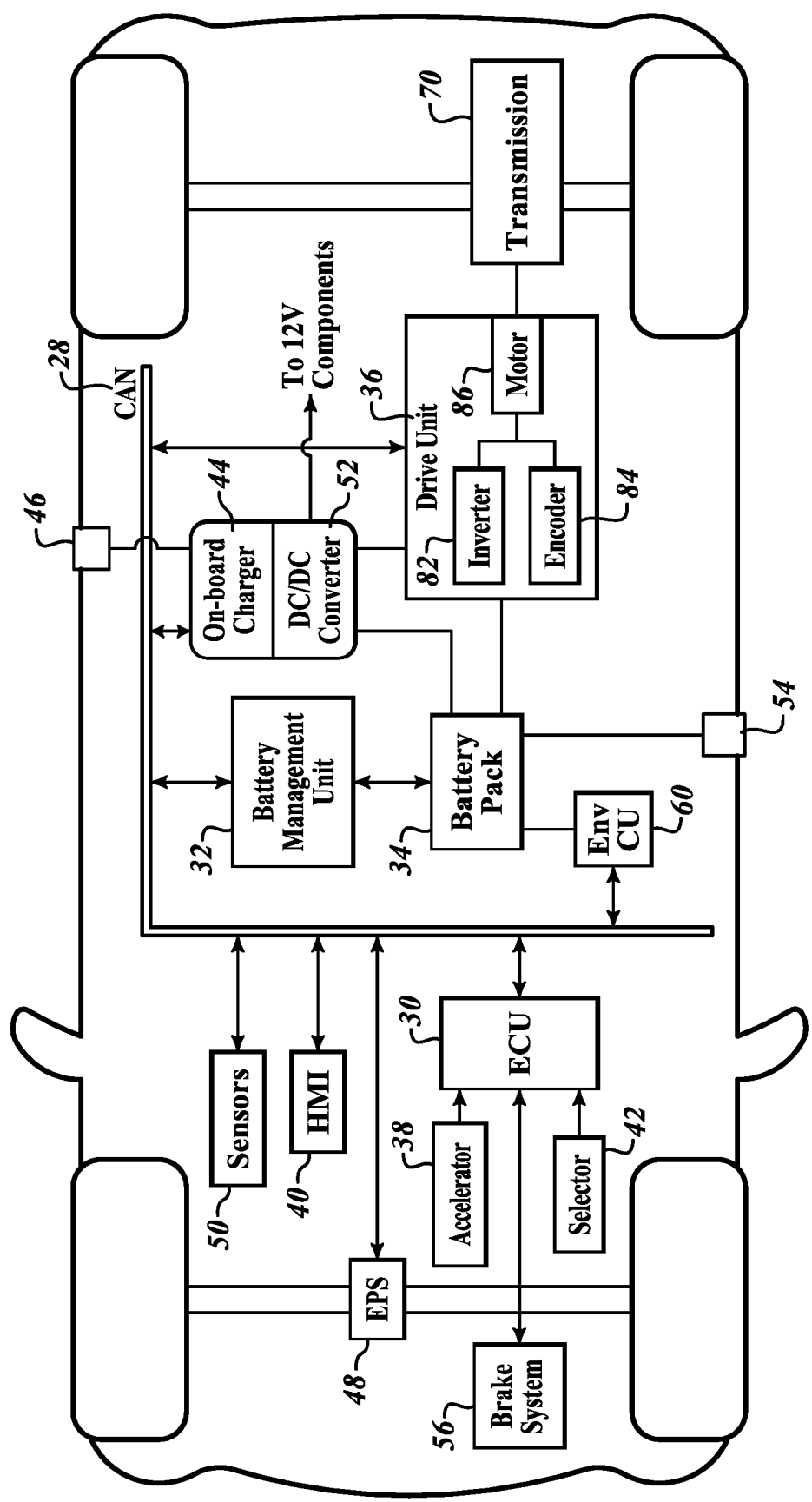
FIG. 2 is a block diagram of an illustrative electric vehicle.

Referring now to FIG. 2, in various embodiments an illustrative vehicle 20 includes components for using electric motor speed or torque control to assist during a vehicle towing scenario. The illustrative vehicle 20 includes an electronics control unit (ECU) 30 that controls operations of numerous components via a controller area network (CAN) bus 28. Other peer-to-peer network buses, such as a local area network (LAN), a wide area network (WAN), or a value added network (VAN), may also be used for enabling communication between the ECU 30 and the other components connected to the peer-to-peer network.

The ECU 30 communicates with an accelerator 38, a drive selector 42, a brake system 56 and/or an electronic power steering (EPS) 48 directly or via the CAN bus 28. The ECU 30 also communicates via the CAN bus 28 with a human-machine interface (HMI) 40, numerous sensors 50, an environmental control unit (EnvCU) 60, a battery management unit (BMU) 32, an on-board charger 44, and multiple drive units 36.

The drive unit 36 may include an inverter 82, an encoder (e.g., resolver) 84 and a motor 86, such as without limitation brushless direct current (BLDC) motors, alternating current induction motors (ACIM), permanent magnet synchronous motors (PMSM), interior PM motors (IPMM), PM switch reluctance motors (PMSRM), or comparable battery-powered motors.

The ECU 30 may include a data processor having computer-readable media configured to store computer-executable instructions configured to cause the data processor to perform a number of functions. The computer-executable instructions are configured to cause the data processor to generate vehicle status information from data received from the sensors 50, the HMI 40, the brake system 56, the drive selector 42, the accelerator 38, the drive unit(s) 36, the EnvCU 60, the BMU 32, the on-board charger 44 or external devices via a wireless communication device. In response to the generation of the vehicle status information, the computer-executable instructions are configured to cause the data processor of the ECU 30 to generate control signals for the various other vehicle components, such as the BMU 32, the on-board charger 44, the drive unit 36, the EPS 48, the EnvCU 60, the HMI 40, the sensors 50, a suspension control unit (not shown), and/or other devices, such as window motors, rearview mirror motors, door motors, door lock motors, or an airbag system. Functions for controlling the drive unit(s) 36 may be executed by a controller having a processor directly connected to the inverter(s) 82 and the encoder(s) 84. The processor has computer-readable media configured to store computer-executable instructions configured to cause the processor to perform some or all of the functions described, herein. The drive unit controller(s) may communicate with the ECU 30 and other components via the CAN bus 28.

In various embodiments and given by way of example only and not of limitation, the various sensors 50 may include wheel speed sensors, gyroscopes, accelerometers, a global positioning system (GPS), light detection and ranging devices (LIDAR), cameras, or comparable devices.

In various embodiments and given by way of example only and not of limitation, the HMI 40 may include mechanical buttons or switches or may include selectable graphical user interface features presented on a vehicle display device(s).

In various embodiments and given by way of example only and not of limitation, the brake system 56 may include a foot pedal, a brake solenoid or pressure sensor, a handbrake, a steering wheel-mounted brake paddle, or comparable brake components. In various embodiments, the accelerator 38 may include a foot pedal, an accelerator solenoid or pressure sensor, a steering wheel-mounted accelerator paddle or comparable accelerator components. In various embodiments, the drive selector 42 may include a lever, a switch, a button or comparable device for selecting a vehicle motion state, such as forward, reverse, tank drive, low gear, neutral). In various embodiments, the EPS 48 may include a steering angle sensor, a torque sensor, an electric motor, gears coupled between the motor and a rack and pinion coupler to the wheels.

In various embodiments and given by way of example only and not of limitation, the BMU 32 communicates with a battery pack 34 to generate battery status information, which is sent to the ECU 30, and the EnvCU 60 via the CAN bus 28. The BMU 32 receives battery information from the battery pack 34 and/or from sensors associated with or included in the battery pack 34. The battery information may include state of charge (SOC), temperature, voltage of battery cells, input/output current, coolant flow, or other values important to battery operations. The BMU 32 uses the battery information to control battery recharging and battery thermal management and to communicate with other vehicle components via the CAN bus 28 or with external components, such as a fast-charging unit, another vehicle, a diagnostic computer, or other comparable devices.

In various embodiments and given by way of example only and not of limitation, the vehicle 20 includes a standard charging AC connector 46 and/or a DC fast charging connector 54. The standard AC charging connector 46 applies source power to the on-board charger 44 which creates charge DC power that is delivered via a DC/DC converter 52 to the battery pack 34 in accordance with instructions from the ECU 30. The DC fast charging connector 54 may apply DC power from an external DC fast charging unit directly to the battery pack 34, in response to communication with the BMU 32 and/or the ECU 30. The on-board charger 44 and/or the DC/DC converter 52 also generate a DC voltage for other vehicle equipment, such as a 12V battery and other 12V compatible devices.

In various embodiments and given by way of example only and not of limitation, the EnvCU 60 powered by the battery pack 34 or by power produced by the DC/DC converter 52 maintains environmental conditions for a cabin of the vehicle 20, for the drive unit 36, and/or for the battery pack 34 in response to instructions from the ECU 30, the BMU 32, and/or the HMI 40.

An inverter 82 provides a motor drive signal to the AC motor 86. Attached to the AC motor 86 is the encoder 84. The encoder 84 generates a motor speed value signal for the respective AC motor 86 and provides the motor speed value signal to the ECU 30. The inverter 82 generates the motor drive signal in response to instructions from the ECU 30.

In various embodiments, additional drive units 36 are used for a multi-wheel powered vehicle. The following operational description is applicable to vehicles that include one or more drive units 36.

The HMI 40 allows a vehicle operator to select from various pre-programmed modes of vehicle operation. One of the pre-programmed modes of vehicle operation include a free-wheel tow mode. In various embodiments, after the vehicle 20 is placed in the free-wheel tow mode, one of the drive units 36 is disconnected from the associated axle(s)/wheel(s). The vehicle 20 includes a disconnect module that physically disconnects the rear wheels from the gearbox attached to an associated motor. However, the other drive unit 36 remains connected to the associated axle(s)/wheel(s) and is instructed by the ECU 30 to perform a hold (speed/torque control) function. The hold function causes the ECU 30 to control the motor(s) 86 to keep the vehicle from moving. The hold function is disabled when a towing force exceeds the predefined threshold amount.

In various embodiments, the ECU 30 may generate an initial motor control signal based on slope grade information received from the sensors 50. If the slope grade information is zero or not enough to cause the vehicle 20 to roll, then no motor control signal is generated by the ECU 30. If the slope grade information is greater than a predefined threshold amount, the ECU 30 generates an initial motor speed signal or an initial motor torque signal. The generated initial motor speed signal or motor torque signal instructs the inverter 82/the motor 86 to counter any gravitational force related to the slope grade. After the ECU 30 generates the initial motor control signal, the ECU 30 receives motor speed information from the encoder 84 and generates a follow-on motor speed signal or motor torque signal in response to the received motor speed information. The newly generated motor speed signal or motor torque signal is compared to a predefined threshold value. The predefined threshold value indicates that the motor control signal is increasing in response to an external force on the vehicle 20, for example a towing force. Once the motor speed signal or the motor control signal meets or exceeds the predefined threshold value, the ECU 30 ceases generation of the motor speed signal or the motor control signal. The vehicle 20 is now in a state of actively being towed.

Figure 3:
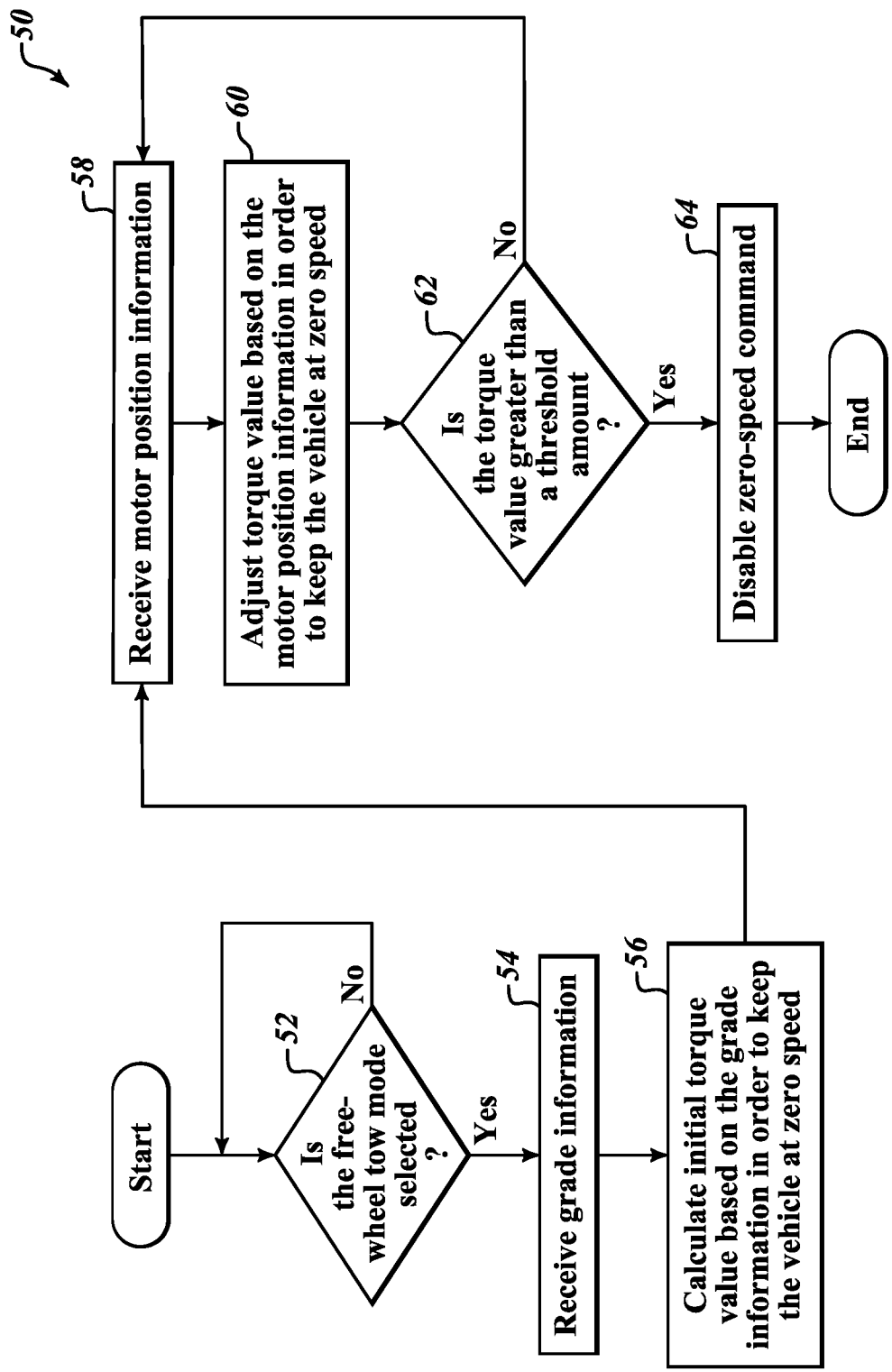
FIG. 3 is a flow diagram of an illustrative method performed by the hill start assist system shown in FIG. 2.

Referring additionally to FIG. 3, in various embodiments an illustrative process 50 is performed by the vehicle 20 for tow mode operations. At a decision block 52, the process 50 determines if the user has activated a free-wheel tow mode via the HMI 40. Once the free-wheel tow mode has been activated, then at a block 54, the vehicle status system 34 or the ECU 30 receives slope grade information. Slope grade information may be generated by one or more gyroscopes located at various locations on the vehicle 20 or may be determined via GPS data. At a block 56, the ECU 30 applies zero-speed command and calculates an initial torque (speed control or brake) value in response to the received slope grade information and vehicle weight information. The initial torque value will be one designed to keep the vehicle 20 from rolling (at zero speed) if the slope grade information indicates that there is a chance the vehicle 20 could roll. At a block 58, the ECU 30 receives motor position information from the encoder 84. At a block 60, the controller adjusts the torque value in response to the received motor position information. At a decision block 62, the ECU 30 determines if the adjusted torque value is greater than a predefined threshold amount. The inverter 82 translates the torque value to a voltage value that is sent to the motor 86. The predefined threshold amount is one that would indicate that the towing vehicle has been attached to the vehicle 20 and a towing force is being applied to the vehicle 20. The generation of a higher torque value would indicate that the ECU 30 is trying to counter motion detected by the encoder 84, thus indicating an external force is being applied to the vehicle 20. If the torque value is greater than the predefined threshold amount, then at a block 64, the zero-speed command is disabled and the vehicle 20 continues operating in the free-wheel tow mode until deselected by the user. In other words, the torque command is no longer adjusted to keep the vehicle speed at zero.

It will be appreciated that the process 50 described above may be applied to the brake system as well. A brake value may take the place of the torque value.

Those skilled in the art will recognize that at least a portion of the ECU 30, the BMU 36, the on-board charger 44, the HMI 40, controllers, components, devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term unit/module/controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of component (e.g., at a first time), as a second type of component (e.g., at a second time, which may in some instances coincide with, overlap, or follow a first time), and/or as a third type of component (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second component that has a second purpose and then, a third component that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different components in as little as a few nanoseconds. A component may reconfigure on-the-fly, e.g., the reconfiguration of a component from a first component into a second component may occur just as the second component is needed. A component may reconfigure in stages, e.g., portions of a first component that are no longer needed may reconfigure into the second component even before the first component has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a component for displaying graphics on a screen, a component for writing data to a storage medium, a component for receiving user input, and a component for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components, the example includes the possibility that the same hardware may implement more than one of the recited components, either contemporaneously or at discrete times or timings. The implementation of multiple components, whether using more components, fewer components, or the same number of components as the number of components, is merely an implementation choice and does not generally affect the operation of the components themselves. Accordingly, it should be understood that any recitation of multiple discrete components in this disclosure includes implementations of those components as any number of underlying components, including, but not limited to, a single component that reconfigures itself over time to carry out the functions of multiple components, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller comprising:
    a processor having computer-readable media configured to store computer-executable instructions configured to cause the processor to:
        receive free-wheel tow mode activation information of an associated vehicle;
        activate a hold mode based on the received free-wheel tow mode activation information;
        generate a zero-speed command in response to the hold mode being activated;
        send the generated zero-speed command to a stabilizing system of the associated vehicle;
        compare the generated zero-speed command to a threshold value; and
        deactivate the hold mode in response to the generated zero-speed command being greater than the threshold value such that the processor ceases to generate the zero-speed command until the free-wheel tow mode is deselected by a user.

2. The controller of claim 1, wherein the computer-executable instructions are further configured to cause the processor to:
    receive slope grade information; and
    generate an initial zero-speed command in response to the received slope grade information.

3. The controller of claim 1, wherein the computer-executable instructions are further configured to cause the processor to adjust the zero-speed command in response to motor position information.

4. The controller of claim 3, wherein the zero-speed command includes a motor speed control signal.

5. The controller of claim 3, wherein the stabilizing system includes an inverter and an electric motor of a drive unit, the inverter being configured to receive the zero-speed command and direct electric motor operation in response thereto.

6. The controller of claim 3, wherein the zero-speed command includes a torque command.

7. The controller of claim 6, wherein the stabilizing system includes an inverter and an electric motor of a drive unit, the inverter being configured to receive the torque command and direct electric motor operation in response thereto.

8. The controller of claim 1, wherein the zero-speed command includes a brake command.

9. The controller of claim 8, wherein the stabilizing system includes a brake system configured to receive the brake command and apply associated braking action in response thereto.

10. The controller of claim 1, wherein the associated vehicle is configured as a highway vehicle.

11. The controller of claim 1, wherein, in response to receiving the free-wheel tow mode activation information, the processor is configured to store computer readable instructions configured to cause the processor to mechanically decouple at least one wheel of the associated vehicle from at least one drive unit of the associated vehicle.

12. A drive unit comprising:
an electric motor;
an encoder configured to generate motor speed information of the electric motor;
an inverter configured to control operation of the electric motor; and
a controller including:
a processor having computer-readable media configured to store computer-executable instructions configured to cause the processor to:
receive free-wheel tow mode activation information of an associated vehicle;
activate a hold mode based on the received free-wheel tow mode activation information;
generate a zero-speed command in response to the hold mode being activated;
send the generated zero-speed command to the inverter;
compare the generated zero-speed command to a threshold value; and
deactivate the hold mode in response to the generated zero-speed command being greater than the threshold value such that the processor ceases to generate the zero-speed command until the free-wheel tow mode is deselected by a user.

13. The drive unit of claim 12, wherein the computer-executable instructions are further configured to cause the processor to:
receive slope grade information; and
generate an initial zero-speed command in response to the received slope grade information.

14. The drive unit of claim 12, wherein the computer-executable instructions are further configured to cause the processor to generate the zero-speed command in response to the motor speed information.

15. The drive unit of claim 14, wherein the zero-speed command includes a motor speed control signal.

16. The drive unit of claim 14, wherein the zero-speed command includes a torque command.

17. A vehicle comprising:
a human-machine interface unit configured to generate a tow mode activation signal; and
a drive unit including:
an electric motor;
an encoder configured to generate motor speed information of the electric motor; and
an inverter configured to control operation of the electric motor; and
a controller including a processor having computer-readable media configured to store computer-executable instructions configured to cause the processor to:
receive the generated tow mode activation signal from the human-machine interface unit;
activate a hold mode in response to the received tow mode activation signal;
generate a zero-speed command in response to the hold mode being activated;
send the generated zero-speed command to the inverter;
compare the generated zero-speed command to a threshold value; and
deactivate the hold mode in response to the generated zero-speed command being greater than the threshold value such that the processor ceases to generate the zero-speed command until the free-wheel tow mode is deselected by a user.

18. The vehicle of claim 17, further comprising:
a vehicle status unit configured to generate slope grade information,
wherein the computer-executable instructions are further configured to cause the processor to:
receive the generated slope grade information; and
generate an initial zero-speed command in response to the received slope grade information.

19. The vehicle of claim 17, wherein the zero speed command includes a motor speed command.

20. The drive unit of claim 17, wherein the zero speed command includes a torque command.

* * * * *